Patented Sept. 7, 1948

2,448,722

UNITED STATES PATENT OFFICE 2,448,722

5-BENZIMIDAZOL DERIVATIVES OF BARBITURIC ACID

Gustav J. Martin, Philadelphia, and Souren Avakian, Oreland, Pa., assignors to The National Drug Company, Philadelphia, Pa., a corporation of Pennsylvania No Drawing. Application April 4, 1946, Serial No. 659,666

4 Claims. (Cl. 260—257)

This invention relates to barbituric acids having a benzimidazole group substituted thereon and more particularly refers to disubstituted barbituric acids wherein the substituents are in the 5-position, one of them being a hydrocarbon group and the other a benzimidazole group. The invention is also concerned with processes for producing the aforesaid compounds.

It is an object of this invention to produce a new class of barbituric acid derivatives. A further object is to produce a class of barbituric acid derivatives which possesses the advantages of presently known barbituric acid derivatives but which eliminate or substantially reduce disadvantages of these compounds, particularly when they are used as therapeutic agents. Additional objects will become apparent from a consideration of the following specification and claims.

These objects are attained in accordance with the present invention wherein a new class of barbituric acid derivatives is produced by reacting a barbituric acid with a halogenated benzimidazole. In a more limited sense this invention is concerned with derivatives of barbituric acid which are substituted in the 5-position with a hydrocarbon group and a benzimidazole group. In a still more restricted sense the invention is directed to disubstituted barbituric acids of the foregoing type wherein the hydrocarbon group contains from 1 to 5 carbon atoms and the benzimidazole group may be substituted, if desired, with a hydrocarbon group of from 1 to 3 carbon atoms, this substitution preferably occurring in the 2-position.

The invention may be more readily understood by a consideration of the following illustrative examples wherein the quantities are stated in parts by weight:

EXAMPLE 1

*5-isobutyl-5-(2-methyl benzimidazole) barbituric acid*

80 parts of diethyl malonate and 68.5 parts of isobutyl bromide were added to a solution of 11.5 parts of sodium dissolved in 400 parts of absolute ethanol. The reaction mixture was refluxed with stirring for 12 hours. The alcohol was then distilled and the residue washed with water. The diethylisobutyl malonate was separated and distilled under reduced pressure. 60 parts of this product were obtained, boiling at 130–135°/24 mm.

60 parts of diethylisobutyl malonate, obtained as above, and 30 parts of urea were refluxed, with stirring, for 12 hours with a solution of 12 parts of magnesium in 300 parts of methyl alcohol. The methyl alcohol was distilled under reduced pressure and the residue treated with 1:1 hydrochloric acid. The precipitate was filtered and recrystallized from isopropyl alcohol to give 32 parts of 5-isobutyl barbituric acid, melting at 233–234° C.

To 18 parts of 5-isobutyl barbituric acid obtained as above and dissolved in 100 parts of 1 N sodium hydroxide was added 16.6 parts of 2-chloromethyl benzimidazole dissolved in 200 parts of hot methyl alcohol. The reaction mixture was heated to 50° C., with stirring, for 1 hour, filtered while hot, and the precipitate recrystallized from alcohol. 14.3 parts of the product, 5-isobutyl-5-(2 methyl benzimidazole) barbituric acid, were obtained, melting at 314° C.

EXAMPLE 2

*5-isopropyl-5-(2-methyl benzimidazole) barbituric acid*

5-isopropyl barbituric acid was obtained by substituting isopropyl bromide for the isobutyl bromide employed in Example 1. 17 parts of this product dissolved in 100 parts of 1 N sodium hydroxide solution were mixed with 16.6 parts of 2-chloromethyl benzimidazole dissolved in 200 parts of hot methyl alcohol. The reaction mixture was stirred at 50–55° C. for 1 hour after the addition of the chloromethyl benzimidazole solution to the isopropyl barbituric acid had been completed. The yield of the crude product was quantitative and its melting point 327–330° C. Crystallization from large amounts of methyl alcohol gave the pure 5-isopropyl-5-(2-methyl benzimidazole barbituric acid.

EXAMPLE 3

*5-ethyl-5-(2-methyl benzimidazole) barbituric acid*

18.8 parts of diethyl ethyl malonate and 10 parts of urea were refluxed for 12 hours with a solution of 4.6 parts of magnesium in 200 parts of methyl alcohol. The alcohol was distilled and the residue treated with 18% hydrochloric acid. The precipitate was filtered and recrystallized from ethyl alcohol to give 5-ethyl barbituric acid melting at 192–193° C.

15.6 parts of 5-ethyl barbituric acid obtained as above was dissolved in 100 parts of 1 N sodium hydroxide solution. To this solution was added, with stirring, and heating (40–50° C.) 17 parts of 2-chloromethyl benzimidazole dissolved in 200 parts of methyl alcohol. 30 minutes after the addition the reaction mixture was cooled and filtered. Recrystallization from a large volume of methyl alcohol gave 22 parts of 5-ethyl-5-(2-methyl benzimidazole) barbituric acid melting at 323-324° C.

EXAMPLE 4

*5-allyl-5-(2-methyl benzimidazole) barbituric acid*

16.8 parts of 5-allyl barbituric acid were dissolved in 100 parts of 1 N sodium hydroxide solution. To this solution was added 16.6 parts of 2-chloromethyl benzimidazole dissolved in 200 parts of hot methanol. The reaction mixture was stirred for one hour, cooled, filtered, and the precipitate recrystallized from methyl alcohol. 20 parts of pure 5-allyl-5-(2-methyl benzimidazole) barbituric acid were obtained melting at 295° C.

The 2-chloromethyl benzimidazole employed in the above examples was obtained by reacting a solution of 108.14 parts of O-phenylenediamine and 139 parts of chloroacetic acid in 1500 parts of 4 N hydrochloric acid at reflux for 2½ hours over a free flame. The reaction mixture was filtered, cooled and neutralized with an ice-cold solution of sodium carbonate (400 parts in 1200 parts of water). The air-dried product was digested for 20 minutes with chloroform to give 100 parts (60%) of 2-chloromethyl benzimidazole melting at 153-155° C. While the pure product melts at 162-163° C., the foregoing impure material was found suitable for use in the above examples.

It is to be understood that the foregoing examples are representative merely of a few of the many methods whereby the products of this invention may be prepared. These examples may be varied widely with respect to the individual reactants and the conditions of reaction without departing from the scope hereof.

In place of 2-chloromethyl benzimidazole it is to be understood that other benzimidazole derivatives may be used. These derivatives are preferably substituted on the 2-position with a halogen group which is advisably, but not necessarily, a chloro group. Likewise, these derivatives may contain additional substituents, for example, alkyl or alkenyl groups. As a general rule, it is advisable for the foregoing hydrocarbon groups to contain from 1 to 3 carbon atoms. It is contemplated that the benzimidazole compounds used in this reaction may be further substituted.

The barbituric acid derivatives employed herein should be substituted with an alkyl or alkenyl group, preferably in the 5-position. As a general rule these groups should contain from 1 to 5 carbon atoms. As in the case of the benzimidazole derivatives it is contemplated that the barbituric acid compounds may be further substituted, although for optimum results the compounds previously mentioned as preferred should generally be employed.

The reaction between the barbituric acid derivative and the halogenated benzimidazole should advisably be carried out in alkaline solution, preferably a solution of sodium hydroxide. In lieu thereof it is to be understood that solutions containing other acid acceptors may be employed. The temperature and time of reaction will of course be dependent to a certain extent upon the individual reactants, but, as can be seen from a consideration of the foregoing examples, these factors may be varied within rather wide limits without affecting the ultimate product. In the same manner the temperature may be increased and the time correspondingly decreased, or vice versa.

The products of this invention are of particular value as pharmacological agents. As is well known, barbituric acid derivatives have pronounced sedative properties, and this is true of the new products described herein. These products may be employed in the same manner as barbituric acid derivatives of the prior art. In addition, they are of value as intermediates in the production of other dervatives of both barbituric acid and benzimidazole.

As many apparently widely different embodiments of this invention may be made without departing from the spirit and scope hereof, it is to be understood that the invention is not limited to the specific embodiments described herein, except as defined in the appended claims.

We claim:

1. A process for preparing barbituric acid derivatives which comprises reacting in an alkaline solution a member selected from the class consisting of 5-alkyl- and 5-alkenyl-barbituric acids with a member selected from the class consisting of 2-monochloro-, 2-monochloro-alkyl- and 2-monochloro-alkenyl-benzimidazoles, and recovering the barbituric acid derivative formed by said reaction.

2. A process for preparing barbituric acid derivatives which comprises reacting in an alkaline solution a member selected from the class consisting of 5-alkyl- and 5-alkenyl-barbituric acids wherein the alkyl and alkenyl groups contain from 1 to 5 carbon atoms with a member selected from the class consisting of 2-monochloro-, 2-monochloroalkyl- and 2-monochloro-alkenyl-benzimidazoles wherein the alkyl and alkenyl groups contain from 1 to 3 carbon atoms, and recovering the barbituric acid derivative formed by said reaction.

3. Disubstituted barbituric acids wherein the substituents are in the 5-position, and wherein one of said substituents is a member selected from the class consisting of alkyl and alkenyl groups and the other is a member selected from the class consisting of 2-benzimidazole, 2-alkyl-benzimidazole, and 2-alkenyl-benzimidazole groups.

4. Disubstituted barbituric acids wherein the substituents are in the 5-position, and wherein one of said substituents is a member selected from the class consisting of alkyl and alkenyl groups in which the alkyl and alkenyl groups contain from 1 to 5 carbon atoms and the other is a member selected from the class consisting 2-benzimidazole, 2-alkyl-benzimidazole and 2-alkenyl-benzimidazole groups in which the alkyl and alkenyl groups contain from 1 to 3 carbon atoms.

GUSTAV J. MARTIN.
SOUREN AVAKIAN.

REFERENCES CITED

The following references are of record in the file of this patent:

UNITED STATES PATENTS

| Number | Name | Date |
| --- | --- | --- |
| 2,139,583 | Heilner | Dec. 6, 1938 |

OTHER REFERENCES

Berichte, vol. 72, (1939), page 730.